United States Patent
Wang (10) Patent No.: US 9,212,787 B1
(45) Date of Patent: Dec. 15, 2015

(54) LEAK-DETECTING SHUT-OFF DEVICE

(71) Applicant: Aquatic Scientific Co., Ltd., Kaohsiung (TW)

(72) Inventor: Fu-Chung Wang, Kaohsiung (TW)

(73) Assignee: Aquatic Scientific Co., Ltd., Kaohsiung (TW)

( * ) Notice: Subject to any disclaimer, the term of this patent is extended or adjusted under 35 U.S.C. 154(b) by 34 days.

(21) Appl. No.: 14/316,422

(22) Filed: Jun. 26, 2014

(51) Int. Cl.
*F17D 5/02* (2006.01)
*B01D 17/02* (2006.01)
*F24H 9/16* (2006.01)
*B67D 7/32* (2010.01)

(52) U.S. Cl.
CPC .............. *F17D 5/02* (2013.01); *B01D 17/0214* (2013.01); *B67D 7/3209* (2013.01); *F24H 9/165* (2013.01)

(58) Field of Classification Search
CPC ......... E03B 9/14; D06F 39/081; F24H 9/165; B67D 7/3209; B01D 17/2014; F17D 5/02
USPC ........................................................ 137/312
See application file for complete search history.

(56) References Cited

U.S. PATENT DOCUMENTS

| | | | | |
|---|---|---|---|---|
| 4,659,063 A * | 4/1987 | Veillette | ..................... | F17D 5/02 251/68 |
| 4,695,375 A * | 9/1987 | Tyler | ..................... | B01D 61/08 210/110 |
| 4,700,742 A * | 10/1987 | Rosaen | ..................... | F16K 17/32 116/275 |
| 4,832,077 A * | 5/1989 | Pilolla | ..................... | B01D 35/04 137/549 |
| 5,362,390 A * | 11/1994 | Widenhoefer | ........ | B01D 27/106 210/136 |
| 5,419,360 A * | 5/1995 | Lechevalier | .......... | F16L 23/167 116/264 |
| 5,591,332 A * | 1/1997 | Reid | ..................... | B01D 35/153 210/235 |
| 5,755,957 A * | 5/1998 | Jeon | ..................... | B01D 61/08 210/134 |
| 5,794,653 A * | 8/1998 | DeSmet | ................ | D06F 39/081 137/486 |
| 5,967,171 A * | 10/1999 | Dwyer, Jr. | ............. | D06F 39/081 137/312 |
| 5,967,173 A * | 10/1999 | Kingsford | ............. | F16K 11/048 137/312 |
| 7,380,293 B2 * | 6/2008 | Gilbertson | ............... | E03D 1/00 137/462 |
| 2010/0012561 A1 * | 1/2010 | Clappison | ................. | F17D 5/02 210/133 |
| 2011/0180464 A1 * | 7/2011 | Schmitt | ................. | B01D 61/08 210/86 |

* cited by examiner

*Primary Examiner* — Craig Schneider
*Assistant Examiner* — Kevin Barss
(74) *Attorney, Agent, or Firm* — C. G. Mersereau; Nikolai & Mersereau, P.A..

(57) ABSTRACT

A leak-detecting shut-off device has a holding mount, a valve seat and an operating set. The holding mount has a connecting segment, a mounting segment, an expansion element and a pushing rod. The expansion element is mounted in the mounting segment. The pushing rod is mounted in the mounting segment, is mounted around the expansion element, and has a mounting cover and multiple pushing panels. The valve seat is connected to the holding mount and has a body, an inlet pipe and an outlet pipe. The body is mounted in the connecting segment and has two connecting boards. The operating set is connected to the valve seat and has a valve shaft, a spring and an operating tab. The valve shaft is movably mounted in the body. The operating tab is connected to the connecting boards, is selectively moved above the pushing rod and abuts against the valve shaft.

16 Claims, 8 Drawing Sheets

LEAK-DETECTING SHUT-OFF DEVICE

BACKGROUND OF THE INVENTION

1. Field of the Invention

The present invention relates to a leak-detecting shut-off device, and more particularly relates to a leak-detecting shut-off device for a water purifier that can apply force evenly, can be actuated accurately and can be assembled conveniently.

2. Description of Related Art

Figure 7:
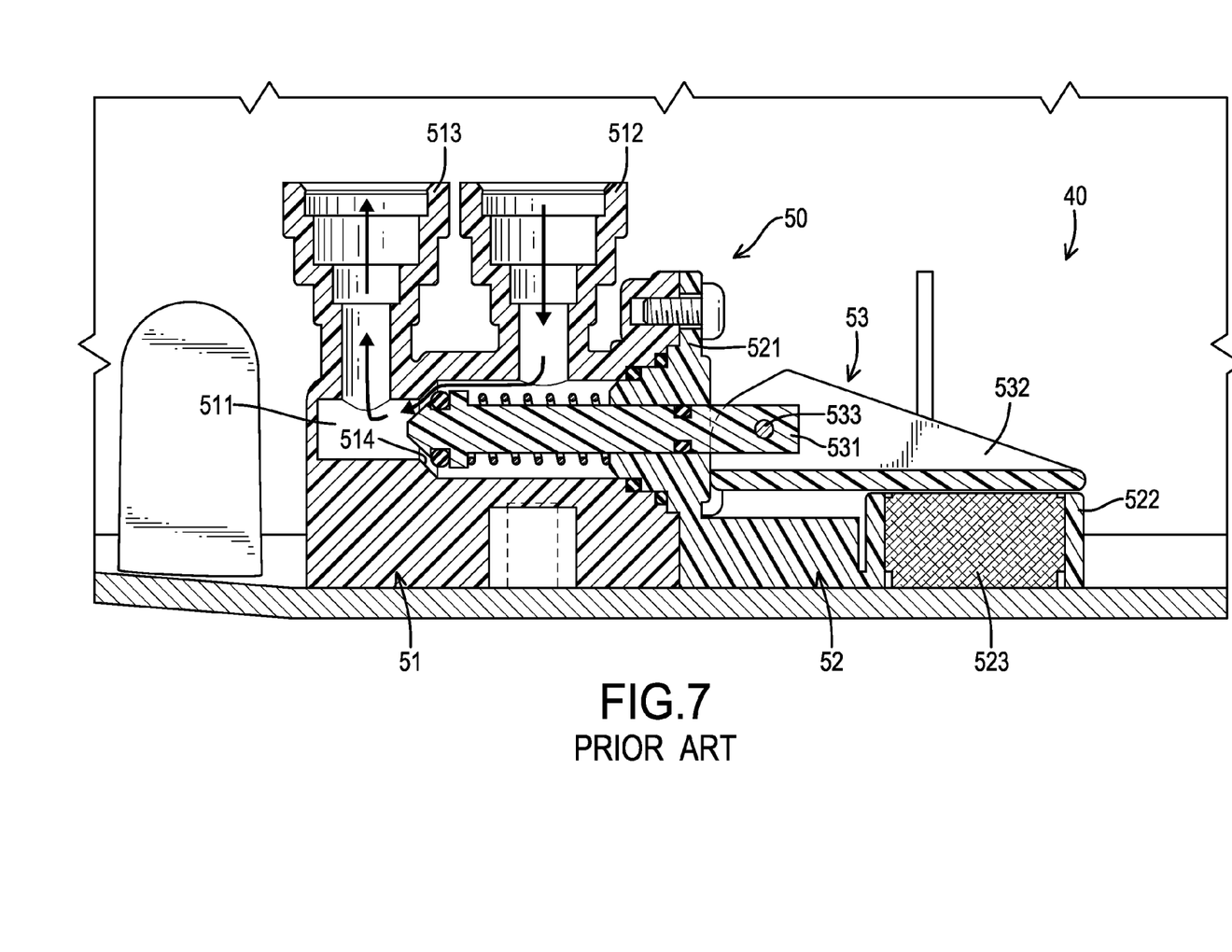
FIG. 7 is a side view in partial section of a leak-detecting shut-off device in accordance with the prior art, shown mounted on a water purifier.

With reference to FIG. 7, a conventional leak-detecting shut-off device 50 for a water purifier 40 has a valve seat 51, a holding mount 52 and an operating set 53. The valve seat 51 is mounted in the water purifier 40 and has a top, a front side, a rear side, a mounting recess 511, an inlet pipe 512 and an outlet pipe 513. The mounting recess 511 is transversally formed in the valve seat 51 and has an open end, a closed end, an inner wall and a sealing surface 514. The open end of the mounting recess 511 is formed through the rear side of the valve seat 51. The closed end of the mounting recess 511 is formed in the valve seat 51 and is opposite to the open end of the mounting recess 511 adjacent to the front side of the valve seat 51. The sealing surface 514 is annularly formed on the inner wall of the mounting recess 511 near the closed end of the mounting recess 511 and is tapered from the open end to the closed end of the mounting recess 511.

The inlet pipe 512 is formed on and protrudes from the top of the valve seat 51 and communicates with the mounting recess 511 between the open end and the sealing surface 514 of the mounting recess 511. The outlet pipe 513 is formed on and protrudes from the top of the valve seat 51 near the front side of the valve seat 51, is parallel with the inlet pipe 512 and communicates with the mounting recess 511 between the closed end and the sealing surface 514 of the mounting recess 511.

The holding mount 52 is L-shaped, is connected to the valve seat 51 and has a front side, a rear side, a connecting board 521, a mounting tube 522 and an expansion element 523. The connecting board 521 is formed on the front side of the holding mount 52 and is connected to the rear side of the valve seat 51 to close the open end of the mounting recess 511. The mounting tube 522 is hollow, is formed on and protrudes from the rear side of the holding mount 52 and is formed with the connecting board 521. The mounting tube 522 has an open top and an open bottom. Preferably, the mounting tube 522 has multiple holding ribs formed on an internal surface of the mounting tube 522 at intervals near the open bottom of the mounting tube 522. The expansion element 523 is mounted in the mounting tube 522 and is held in the mounting tube 522 by the holding ribs.

The operating set 53 is connected to the valve seat 51 and the holding mount 52 and has a valve shaft 531 and an operating tab 532. The valve shaft 531 is movably mounted in the mounting recess 511 of the valve seat 51 and has a sealing end and a pivot end. The sealing end of the valve shaft 531 is mounted in the mounting recess 511 adjacent to the sealing surface 514 and selectively abuts against the sealing surface 514 of the mounting recess 511. The pivot end of the valve shaft 531 extends out of the valve seat 51 via the connecting board 521 of the holding mount 52. The operating tab 532 is pivotally connected to the valve shaft 531, abuts against the connecting board 521, and is selectively mounted above the expansion element 523 that is mounted in the mounting tube 522. The operating tab 532 has an abutting end, an operating end, a pivot 533 and a spring 534. The abutting end of the operating tab 532 is pivotally connected to the pivot end of the valve shaft 531 and rotatably abuts the connecting board 521 of the holding mount 52. The operating end of the operating tab 532 extends above the expansion element 523. The pivot 533 is connected to the abutting end of the operating tab 532 and is connected to the pivot end of the valve shaft 531 to enable the operating tab 532 to rotatably connect with the valve shaft 531. The spring 534 is mounted around the valve shaft 531 between the sealing end of the valve shaft 531 and the connecting board 521 of the holding mount 52.

Figure 8:
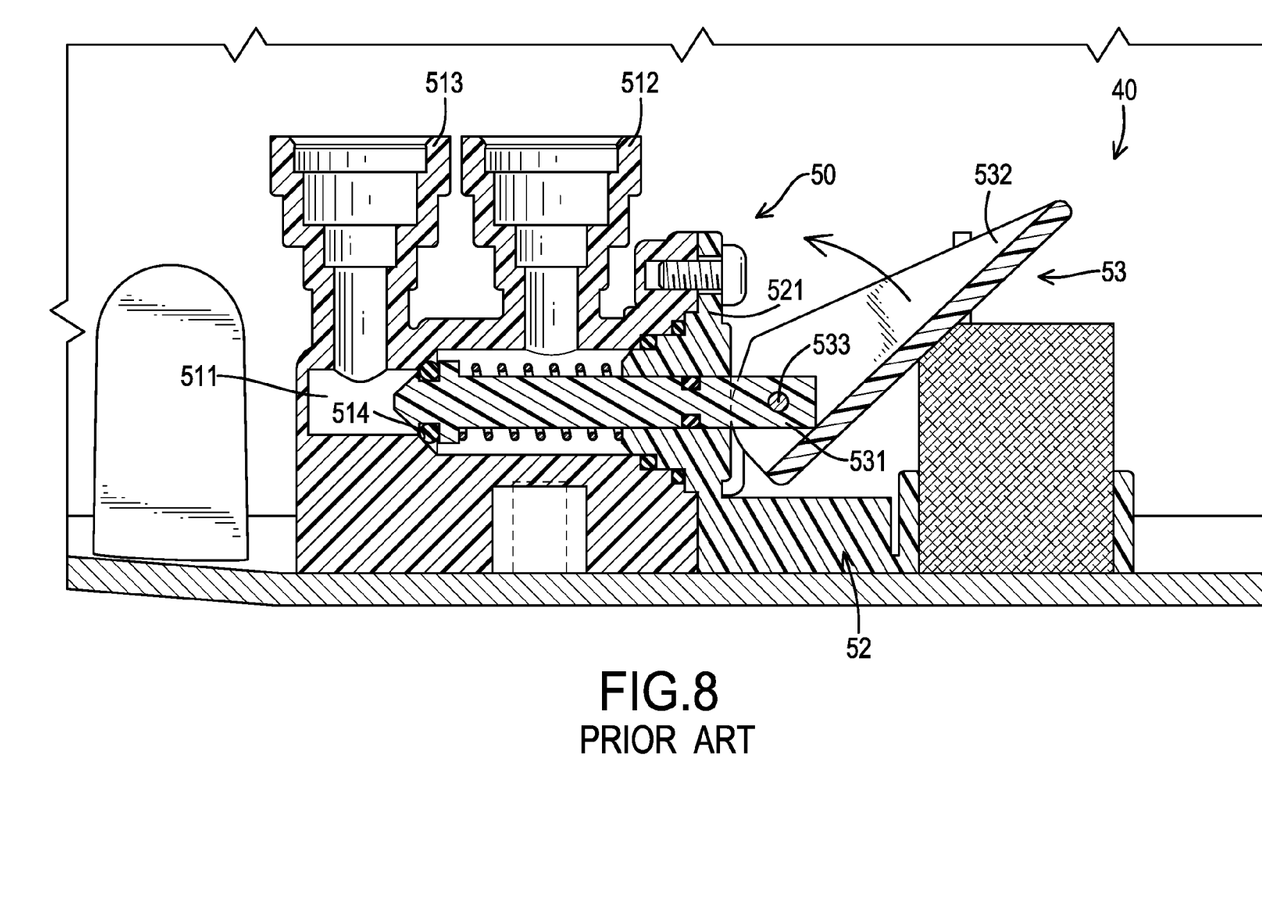
FIG. 8 is an operational side view in partial section of the leak-detecting shut-off device in FIG. 7.

In use, when the operating tab 532 is rotated relative to the connecting board 521 to move above the mounting tube 522, the valve shaft 531 is moved relative to the mounting recess 511 with the operating tab 532 and this will enable the sealing end of the valve shaft 531 to move away from the sealing surface 514 of the mounting recess 511. Then, the outlet pipe 513 communicates with the inlet pipe 512 via the mounting recess 511 and a gap that is formed between the sealing surface 514 of the mounting recess 511 and the sealing end of the valve shaft 531. With reference to FIG. 8, when water leaks out of the water purifier 40, the expansion element 523 draws the leaking water from the open bottom of the mounting tube 522 and is expanded out of the open top of the mounting tube 522 to upwardly push the operating end of the operating tab 532. The operating tab 532 is rotated relative to the connecting board 521 by the upward force of the expansion element 523, and the valve shaft 531 is moved with the operating tab 532 relative to the mounting recess 511 to enable the sealing end of the valve shaft 531 to abut against the sealing surface 514 of the mounting recess 511. Then, water that flows in the inlet pipe 512 cannot flow into the outlet pipe 513 via the mounting recess 511 and this can provide a shutoff effect to the water purifier 40.

Although the conventional leak-detecting shut-off device 50 can provide a shutoff effect to the water purifier 40, the expansion element 523 pushes the operating tab 532 upwardly by a partial area of a top of the expansion element 523 and this cannot enable the total pushing force of the expanded expansion element 523 to evenly push the operating tab 532. Then, the operating tab 532 can be pushed to rotate relative to the connecting board 521 after the expansion element 523 is expanded to a certain volume, and that means the conventional leak-detecting shut-off device 50 cannot immediately and accurately provide a shutoff effect to the water purifier 40.

In addition, the operating tab 532 is connected to the pivot end of the valve shaft 531 by the pivot 533 and the spring 534 is mounted around the valve shaft 531, and an elastic force of the spring 534 will enable the pivot end of the valve shaft 531 to move into the mounting recess 511. Then, in assembly, the valve shaft 531 needs to be fixed by a tool to enable the pivot end of the valve shaft 531 to extend out of the valve seat 51 and to connect with the abutting end of the operating tab 532 by the pivot 533. Therefore, the conventional leak-detecting shut-off device 50 is inconvenient and time-consuming in assembly.

Therefore, the present invention provides a leak-detecting shut-off device to mitigate or obviate the aforementioned problems.

SUMMARY OF THE INVENTION

The main objective of the present invention is to provide a leak-detecting shut-off device for a water purifier that can apply force evenly, can be actuated accurately and can be assembled conveniently.

The leak-detecting shut-off device in accordance with the present invention has a holding mount, a valve seat and an operating set. The holding mount has a connecting segment, a mounting segment, an expansion element and a pushing rod. The expansion element is mounted in the mounting segment. The pushing rod is mounted in the mounting segment, is mounted around the expansion element and has a mounting cover and multiple pushing panels. The valve seat is connected to the holding mount and has a body, an inlet pipe and an outlet pipe. The body is mounted in the connecting segment and has two connecting boards. The operating set is connected to the valve seat and has a valve shaft, a spring and an operating tab. The valve shaft is movably mounted in the body. The operating tab is connected to the connecting boards, is selectively moved above the pushing rod and abuts against the valve shaft.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
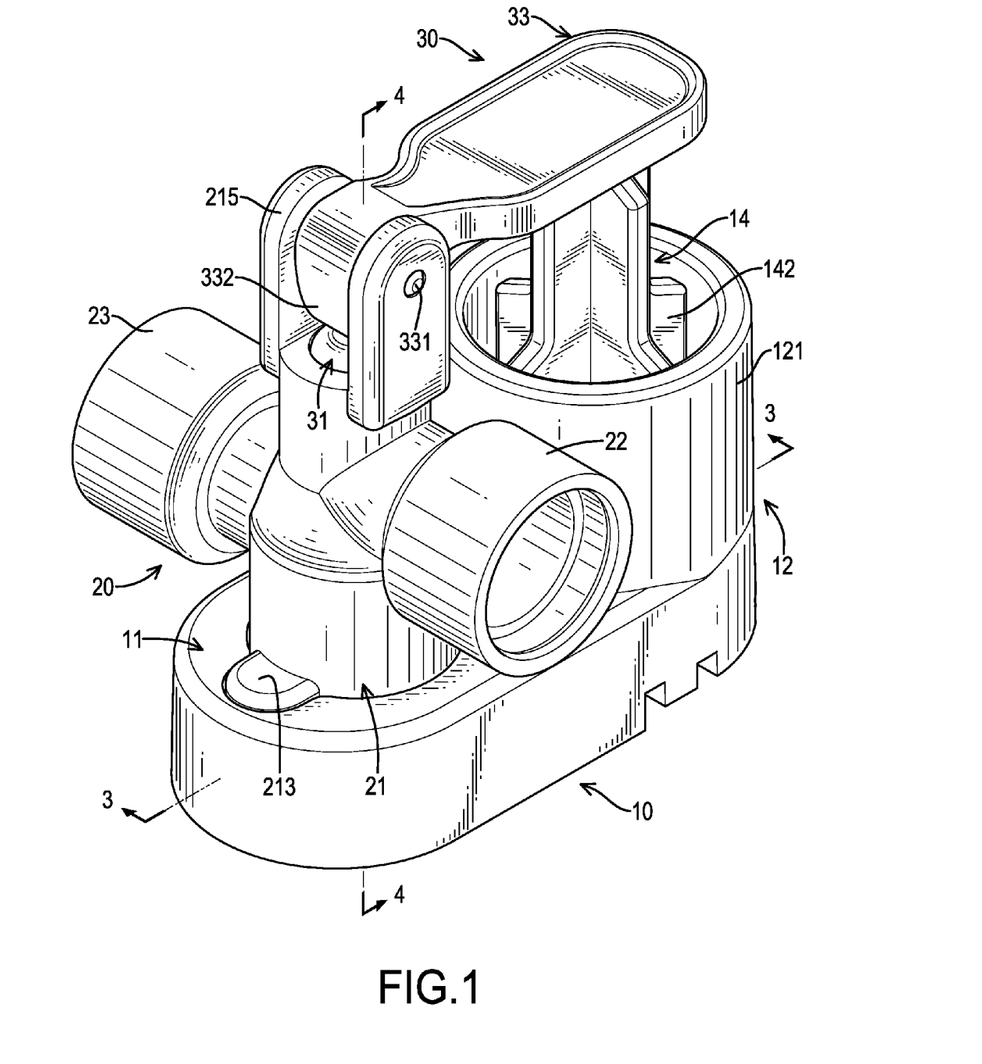
FIG. 1 is a perspective view of a leak-detecting shut-off device in accordance with the present invention.
Figure 2:
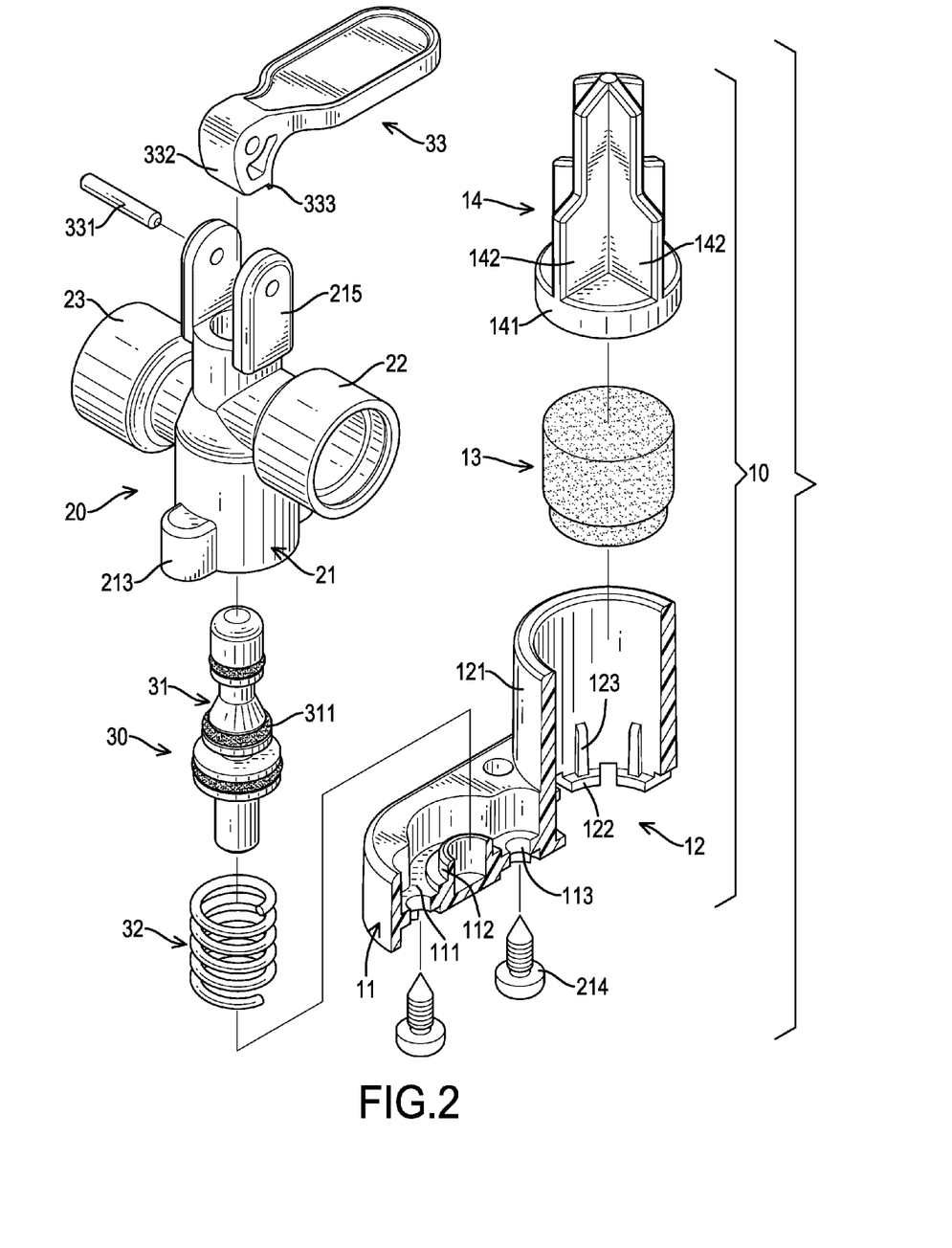
FIG. 2 is an exploded perspective view of the leak-detecting shut-off device in FIG. 1.
Figure 3:
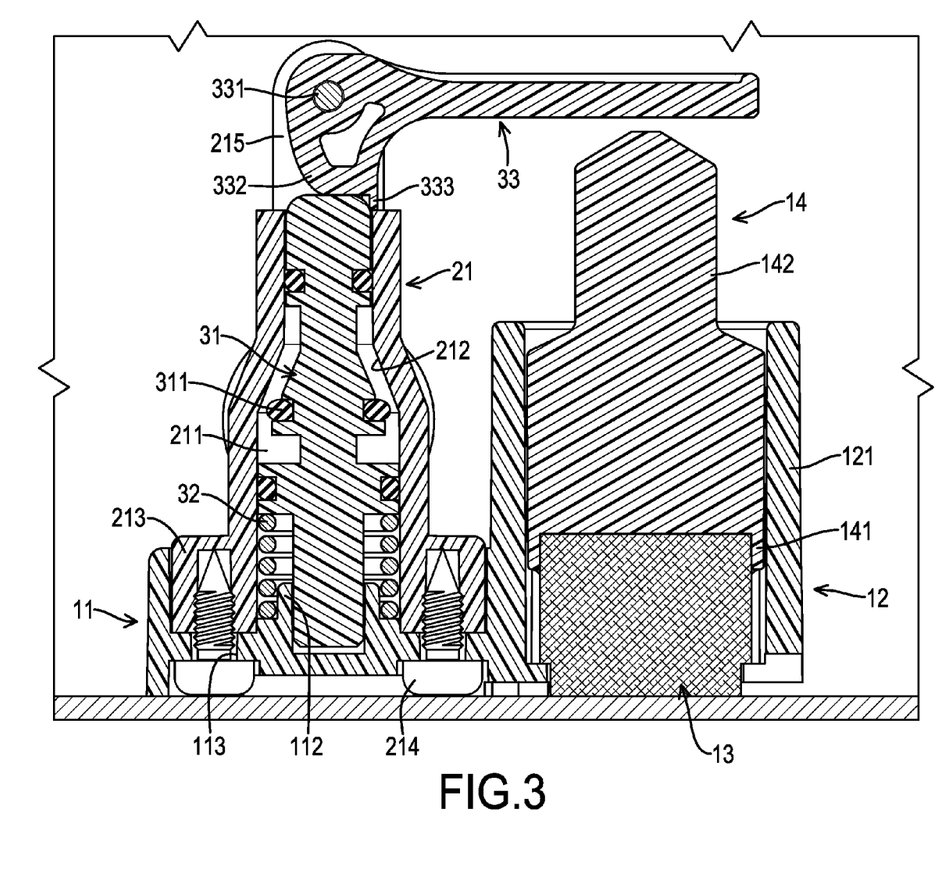
FIG. 3 is an enlarged side view in partial section of the leak-detecting shut-off device along line 3-3 in FIG. 1.

With reference to FIGS. 1 to 3, a leak-detecting shut-off device in accordance with the present invention is mounted on a water purifier and comprises a holding mount 10, a valve seat 20 and an operating set 30.

The holding mount 10 has a front end, a rear end, a connecting segment 11, a mounting segment 12, an expansion element 13 and a pushing rod 14. The connecting segment 11 is formed on the front end of the holding mount 10 and has a top, a connecting recess 111, a connecting base 112 and two through holes 113. The connecting recess 111 is formed in the top of the connecting segment 11 and has a bottom. The connecting base 112 is hollow and is formed on and protrudes from the bottom of the connecting recess 111. The through holes 113 are formed through the bottom of the connecting recess 111 beside the connecting base 112.

The mounting segment 12 is formed on the rear end of the holding mount 10, is formed with the connecting segment 11 and has a mounting tube 121. The mounting tube 121 is hollow, is formed on and protrudes from the rear end of the holding mount 10, and has an open top, an open bottom, an inner wall, multiple positioning slices 122 and multiple supporting ribs 123. The positioning slices 122 are radially formed on and protrude inwardly from the inner wall of the mounting tube 121 at intervals at the open bottom of the mounting tube 121. The supporting ribs 123 are axially formed on and protrude from the inner wall of the mounting tube 121 near the open bottom of the mounting tube 121, and each one of the supporting ribs 123 has a top end. Preferably, a gap is formed between the top ends of the supporting ribs 123 and the positioning slices 122.

The expansion element 13 is mounted in the mounting tube 121 via the open top of the mounting tube 121, is mounted in the gap between the supporting ribs 123 and the positioning slices 122, and has a bottom and a top. The bottom of the expansion element 13 extends out of the open bottom of the mounting tube 121. The top of the expansion element 13 extends out of the top ends of the supporting ribs 123.

The pushing rod 14 is mounted in the mounting tube 121, is mounted around the top of the expansion element 13, and abuts the top ends of the supporting ribs 123. The pushing rod 14 has a mounting cover 141 and multiple pushing panels 142. The mounting cover 141 is round and is mounted around the top of the expansion element 13 and abuts the top ends of the supporting ribs 123. The pushing panels 142 are formed on and protrude from a top of the mounting cover 141 and extend out of the open top of the mounting tube 121. Preferably, the pushing rod 14 has two pushing panels 142 crossly formed on the top of the mounting cover 141.

Figure 4:
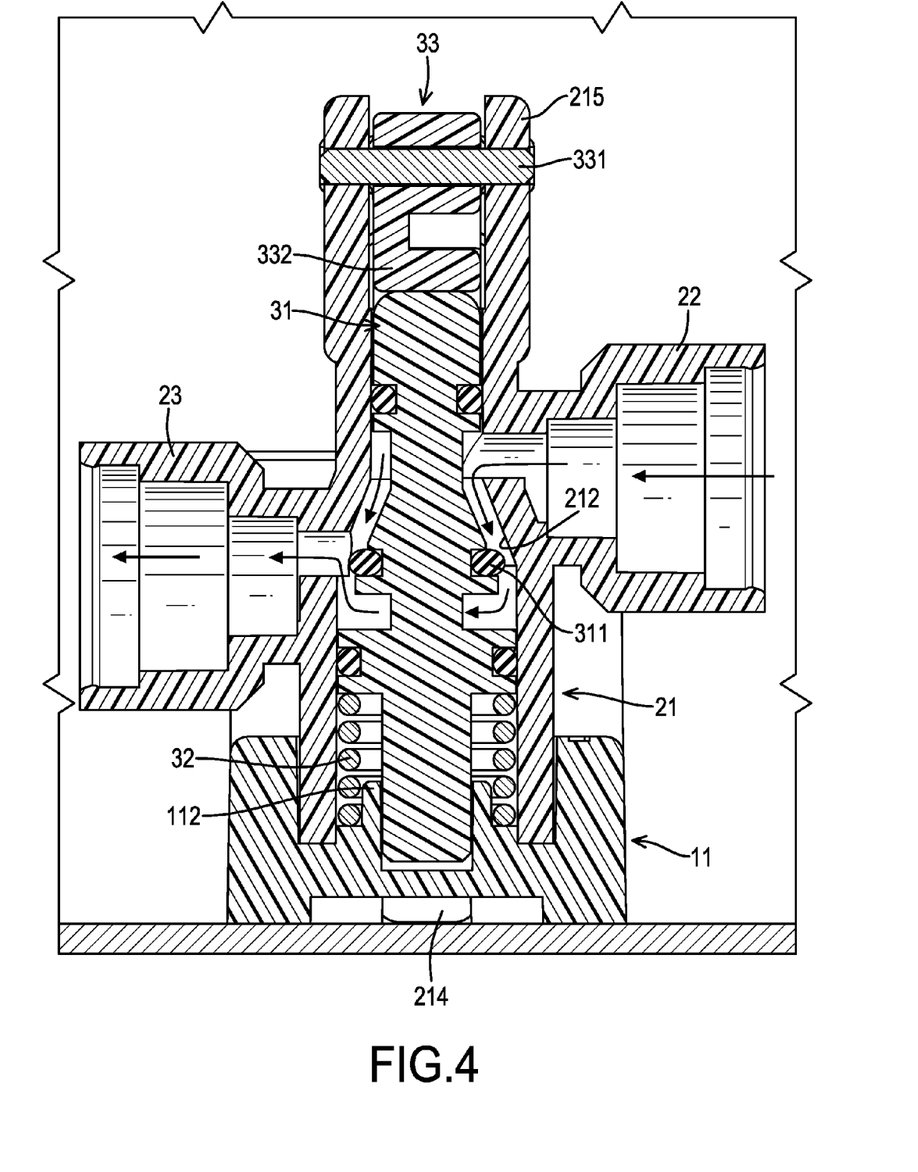
FIG. 4 is another enlarged side view in partial section of the leak-detecting shut-off device along line 4-4 in FIG. 1.

With reference to FIGS. 3 and 4, the valve seat 20 is connected to the holding mount 10 and has a body 21, an inlet pipe 22 and an outlet pipe 23. The body 21 is a hollow tube, is mounted in the connecting recess 111 of the connecting segment 11, and is mounted around the connecting base 112 of the connecting segment 11.

The body 21 has an open bottom, an open top, an external surface, a mounting recess 211, a sealing surface 212, two fixing tubes 213, two fasteners 214 and two connecting boards 215. The open bottom of the body 21 is mounted around the connecting base 112 of the connecting segment 11. The mounting recess 211 is formed in the body 21 between the open top of the body 21 and the open bottom of the body 21, communicates with the open top of the body 21 and the open bottom of the body 21, and has an inner wall. The sealing surface 212 is annularly formed on the inner wall of the mounting recess 211 near the open top of the body 21 and is tapered from the open bottom of the body 21 to the open top of the body 21.

The fixing tubes 213 are axially formed on and protrude from the external surface of the body 21 at the open bottom of the body 21, are mounted in the connecting recess 111 of the connecting segment 11, and respectively align with the through holes 113 of the connecting segment 11. The fasteners 214 are respectively mounted through the through holes 113 of the connecting segment 11 and are respectively connected to the fixing tubes 213 to securely connect the valve seat 20 with the holding mount 10. The connecting boards 215 are axially formed on and protrude from the external surface of the body 21 at the open top of the body 21 and are parallel with each other.

The inlet pipe 22 is transversally formed on and protrudes from the external surface of the body 21 between the sealing surface 212 and the open top of the body 21 and communicates with the mounting recess 211. The outlet pipe 23 is transversally formed on and protrudes from the external surface of the body 21 between the sealing surface 212 and the open bottom of the body 21 and communicates with the mounting recess 211. Preferably, the outlet pipe 23 is formed on the body 21 and aligns with the inlet pipe 22.

The operating set 30 is connected to the valve seat 20 and has a valve shaft 31, a spring 32 and an operating tab 33. The valve shaft 31 is movably mounted in the mounting recess 211 of the body 21 and has a lower end, an upper end, a middle segment and a sealing ring 311. The lower end of the valve shaft 31 is mounted in the connecting base 112 of the connecting segment 11. The upper end of the valve shaft 31 extends out of the open top of the body 21 between the connecting boards 215. The sealing ring 311 is mounted around the middle segment of the valve shaft 31 and selectively abuts against the sealing surface 212 of the body 21.

The spring 32 is mounted in the mounting recess 211, is mounted around the connecting base 112 and the valve shaft 31 between the middle segment of the valve shaft 31 and the lower end of the valve shaft 31, and abuts against the valve shaft 31. When the spring 32 abuts against the valve shaft 31, the upper end of the valve shaft 31 extends out of the open top of the body 21.

The operating tab 33 is pivotally connected to the connecting boards 215 of the body 21, is selectively moved above the pushing rod 14 and abuts against the upper end of the valve shaft 31. The operating tab 33 has a pivot end, an abutting end, an external surface, a pivot 331, an engaging protrusion 332 and a limiting rib 333. The pivot end of the operating tab 33 is pivotally connected to the connecting boards 215 of the body 21. The abutting end of the operating tab 33 is selectively moved above the pushing panels 142 of the pushing rod 14.

The pivot 331 is mounted through the connecting boards 215 and is connected to the pivot end of the operating tab 33 to enable the operating tab 33 to rotate relative to the connecting boards 215 of the body 21. The engaging protrusion 332 is formed on and protrudes from the external surface of the operating tab 33 at the pivot end of the operating tab 33 and abuts against the upper end of the valve shaft 31. The limiting rib 333 is formed on and protrudes from the external surface of the operating tab 33 near the engaging protrusion 332 and selectively abuts against the upper end of the valve shaft 31 to limit a rotating angle of the operating tab 33 relative to the valve seat 20. Furthermore, when the limiting rib 333 abuts against the upper end of the valve shaft 31, the abutting end of the operating tab 33 is moved above the pushing rod 14.

In use, with reference to FIGS. 3 and 4, the operating tab 33 is rotated relative to the connecting boards 215 of the body 21 to enable the limiting rib 333 to abut against the upper end of the valve shaft 31. Then, the abutting end of the operating tab 33 is moved above the pushing rod 14. In addition, when the operating tab 33 is rotated relative to the body 21, the engaging protrusion 332 abuts against and pushes the valve shaft 31 to move downwardly relative to the body 21. Then, the sealing ring 311 is moved downwardly away from the sealing surface 212 of the body 21 to form a gap between the sealing ring 311 and the sealing surface 212 of the body 21, and the spring 32 is compressed between the connecting base 112 and the valve shaft 31. The gap between the sealing ring 311 and the sealing surface 212 can allow water that flows in the inlet pipe 22 to flow into the outlet pipe 23 via the mounting recess 211 and the gap.

Figure 5:
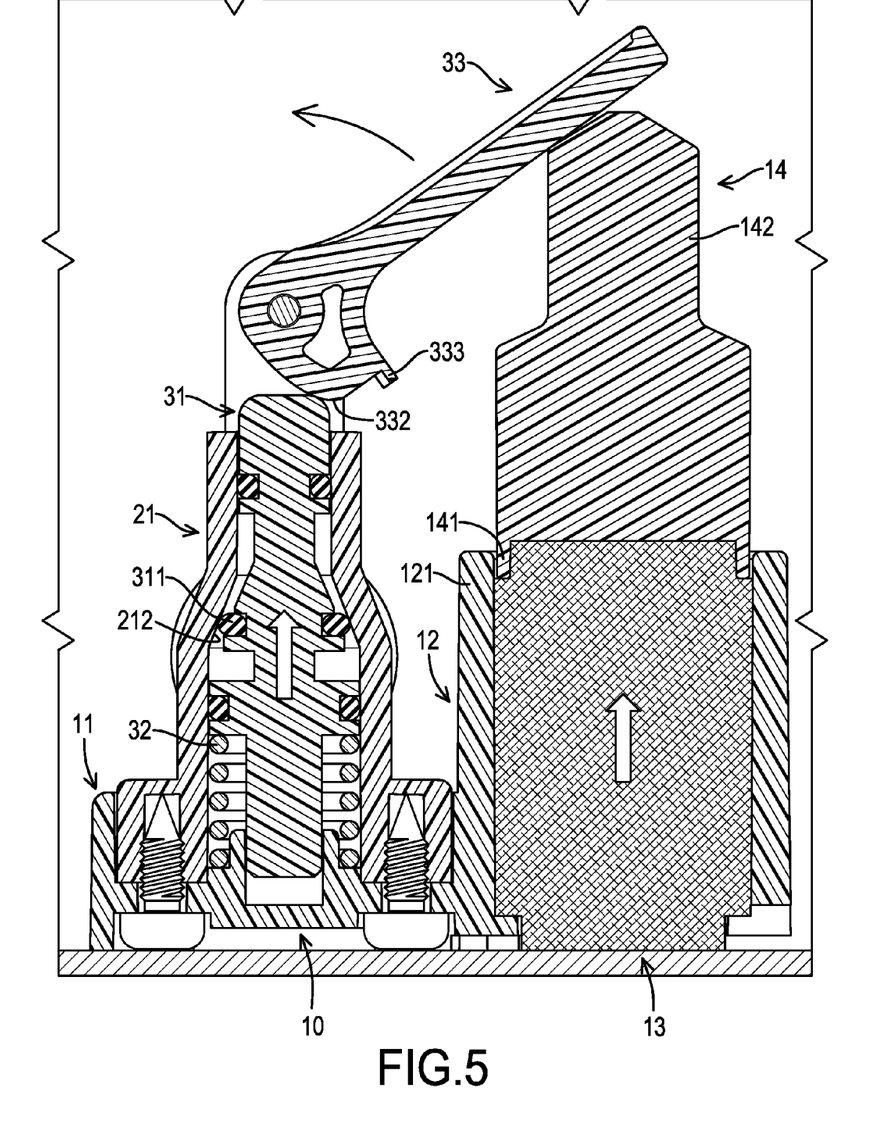
FIG. 5 is an enlarged operational side view in partial section of the leak-detecting shut-off device in FIG. 3.
Figure 6:
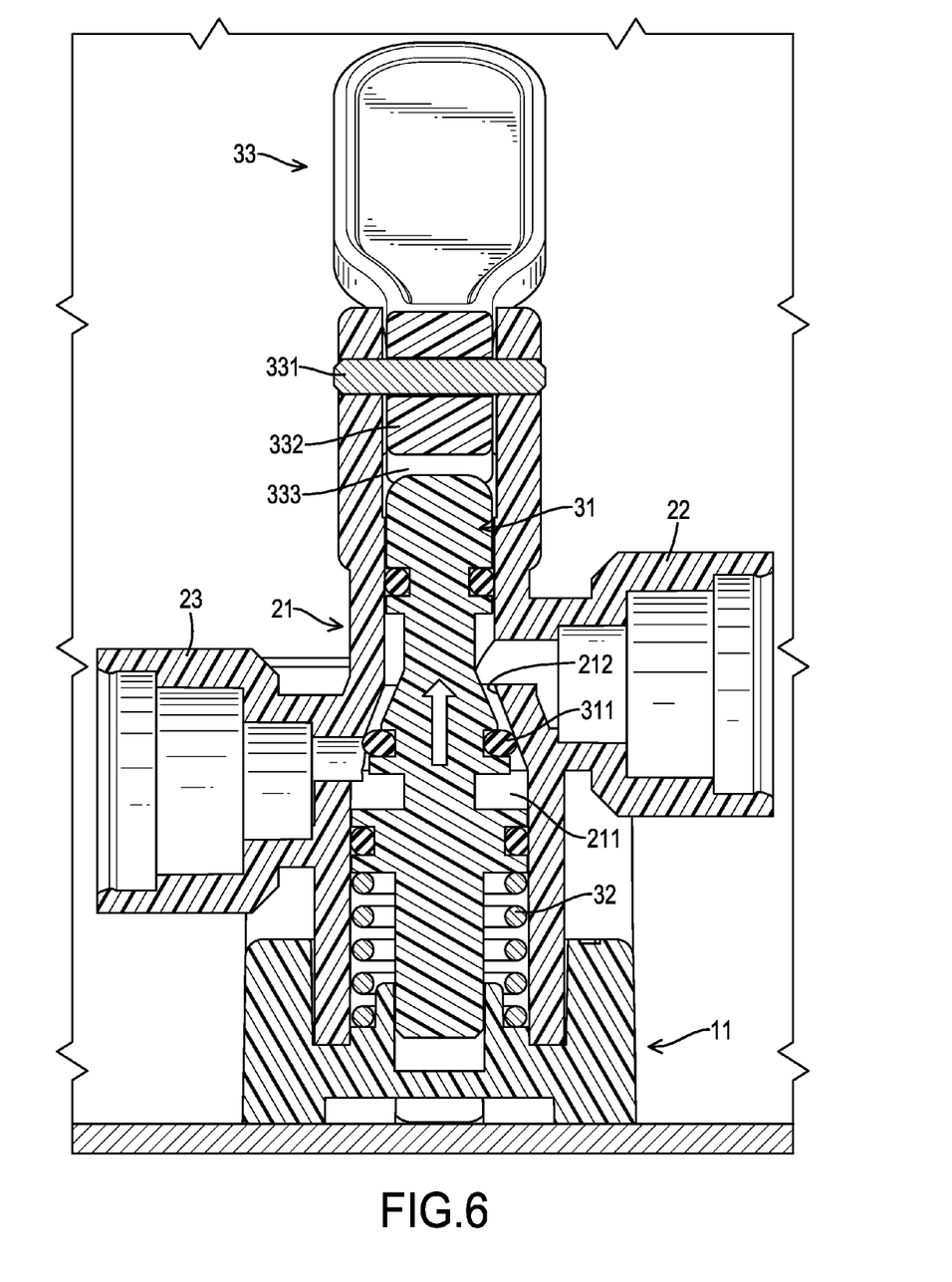
FIG. 6 is another enlarged operational side view in partial section of the leak-detecting shut-off device in FIG. 4.

With reference to FIGS. 5 and 6, when water leaks out of the water purifier, the expansion element 13 draws the leaking water from the open bottom of the mounting tube 121 and is expanded upwardly out of the open top of the mounting tube 121 to evenly push the mounting cover 141 of the pushing rod 14. Then, the pushing panels 142 are moved upwardly with the mounting cover 141 to push the abutting end of the operating tab 33, and this can enable the operating tab 33 to rotate relative to the connecting boards 215 of the body 21 and can enable the limiting rib 333 to separate from the upper end of the valve shaft 31. When the limiting rib 333 separates from the upper end of the valve shaft 31, the valve shaft 31 is moved upward relative to the body 21 by a compression force of the spring 32 to enable the sealing ring 311 to abut against the sealing surface 212 of the body 21. As the sealing ring 311 abuts against the sealing surface 212 of the body 21, the gap between the sealing ring 311 and the sealing surface 212 is closed, and water that flows in the inlet pipe 22 cannot flow into the outlet pipe 23 via the mounting recess 211 and this can provide a shutoff effect to the water purifier.

According to the above-mentioned features and structural relationship of the leak-detecting shut-off device, in use, the total pushing force that is provided by the expanded expansion element 13 can be evenly applied on the mounting cover 141, and the operating tab 33 can be pushed to rotate relative to the body 21 to close the gap between the sealing ring 311 and the sealing surface 212 without waiting for the expansion element 13 to expand to a certain volume. That means the leak-detecting shut-off device in accordance with the present invention can immediately and accurately provide a shutoff effect to the water purifier. Furthermore, the operating tab 33 is pivotally connected to the connecting boards 215 of the body 21 above the valve shaft 31 without connecting to the valve shaft 31, and this means the operating tab 33 is not directly connected to the valve shaft 31 and the valve shaft 31 does not need to be fixed by a tool in assembly. Therefore, the leak-detecting shut-off device in accordance with the present invention is convenient and time-saving in assembly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A leak-detecting shut-off device comprising:
   a holding mount having
      a front end;
      a rear end;
      a connecting segment formed on the front end of the holding mount;
      a mounting segment formed on the rear end of the holding mount and formed with the connecting segment;
      an expansion element mounted in the mounting segment and having a bottom extending out of the mounting segment; and
      a pushing rod mounted in the mounting segment, mounted around the expansion element and having
         a mounting cover mounted around the expansion element; and
         multiple pushing panels formed on and protruding from the mounting cover and extending out of the mounting segment;
   a valve seat connected to the holding mount and having
      a body mounted in the connecting segment and having
         an open bottom;
         an open top;
         an external surface;
         a mounting recess formed in the body between the open top of the body and the open bottom of the body, communicating with the open top of the body and the open bottom of the body, and having an inner wall;
         a sealing surface annularly formed on the inner wall of the mounting recess near the open top of the body and being tapered from the open bottom of the body to the open top of the body; and two connecting boards axially formed on and protruding from the external surface of the body at the open top of the body and being parallel with each other;

an inlet pipe transversally formed on and protruding from the external surface of the body between the sealing surface and the open top of the body and communicating with the mounting recess; and an outlet pipe transversally formed on and protruding from the external surface of the body between the sealing surface and the open bottom of the body and communicating with the mounting recess; and an operating set connected to the valve seat and having
a valve shaft movably mounted in the mounting recess of the body and having
a lower end mounted in the connecting segment;
an upper end extending out of the open top of the body between the connecting boards;
a middle segment; and
a sealing ring mounted around the middle segment of the valve shaft and selectively abutting against the sealing surface of the body;
a spring mounted in the mounting recess, mounted around the valve shaft between the middle segment of the valve shaft and the lower end of the valve shaft, and abutting against the valve shaft; and
an operating tab pivotally connected to the connecting boards of the body, selectively moved above the pushing rod and abutting against the upper end of the valve shaft.

2. The leak-detecting shut-off device as claimed in claim 1, wherein the operating tab has
a pivot end pivotally connected to the connecting boards of the body;
an abutting end selectively moved above the pushing panels of the pushing rod;
an external surface;
a pivot mounted through the connecting boards and connected to the pivot end of the operating tab to enable the operating tab to rotate relative to the connecting boards of the body;
an engaging protrusion formed on and protruding from the external surface of the operating tab at the pivot end of the operating tab and abutting against the upper end of the valve shaft; and
a limiting rib formed on and protruding from the external surface of the operating tab near the engaging protrusion and selectively abutting against the upper end of the valve shaft.

3. The leak-detecting shut-off device as claimed in claim 1, wherein
the connecting segment has
a top;
a connecting recess formed in the top of the connecting segment and having a bottom; and
a connecting base being hollow and formed on and protruding from the bottom of the connecting recess;
the body is a hollow tube, is mounted in the connecting recess of the connecting segment, and is mounted around the connecting base of the connecting segment;
the open bottom of the body is mounted around the connecting base of the connecting segment;
the lower end of the valve shaft is mounted in the connecting base of the connecting segment; and
the spring is mounted around the connecting base of the connecting segment.

4. The leak-detecting shut-off device as claimed in claim 2, wherein
the connecting segment has
a top;
a connecting recess formed in the top of the connecting segment and having a bottom; and
a connecting base being hollow and formed on and protruding from the bottom of the connecting recess;
the body is a hollow tube, is mounted in the connecting recess of the connecting segment, and is mounted around the connecting base of the connecting segment;
the open bottom of the body is mounted around the connecting base of the connecting segment;
the lower end of the valve shaft is mounted in the connecting base of the connecting segment; and
the spring is mounted around the connecting base of the connecting segment.

5. The leak-detecting shut-off device as claimed in claim 3, wherein
the connecting segment of the holding mount has two through holes formed through the bottom of the connecting recess beside the connecting base; and
the body has
two fixing tubes axially formed on and protruding from the external surface of the body at the open bottom of the body, the fixing tubes mounted in the connecting recess of the connecting segment and respectively aligning with the through holes of the connecting segment; and
two fasteners respectively mounted through the through holes of the connecting segment and respectively connected to the fixing tubes to securely connect the valve seat with the holding mount.

6. The leak-detecting shut-off device as claimed in claim 4, wherein
the connecting segment of the holding mount has two through holes formed through the bottom of the connecting recess beside the connecting base; and
the body has
two fixing tubes axially formed on and protruding from the external surface of the body at the open bottom of the body, the fixing tubes mounted in the connecting recess of the connecting segment and respectively aligning with the through holes of the connecting segment; and
two fasteners respectively mounted through the through holes of the connecting segment and respectively connected to the fixing tubes to securely connect the valve seat with the holding mount.

7. The leak-detecting shut-off device as claimed in claim 5, wherein
the mounting segment of the holding mount has
a mounting tube being hollow, formed on and protruding from the rear end of the holding mount and having
an open top;
an open bottom;
an inner wall;
multiple positioning slices radially formed on and protruding inwardly from the inner wall of the mounting tube at intervals at the open bottom of the mounting tube;
multiple supporting ribs axially formed on and protruding from the inner wall of the mounting tube near the open bottom of the mounting tube, and each one of the supporting ribs having a top end; and a gap formed between the top ends of the supporting ribs and the positioning slices;

the expansion element is mounted in the mounting tube via the open top of the mounting tube, is mounted in the gap between the supporting ribs and the positioning slices, and has a top extending out of the top ends of the supporting ribs;

the bottom of the expansion element extends out of the open bottom of the mounting tube;

the pushing rod is mounted in the mounting tube, is mounted around the top of the expansion element, and abuts the top ends of the supporting ribs;

the mounting cover is round, is mounted around the top of the expansion element, and abuts the top ends of the supporting ribs; and the pushing panels are formed on and protrude from a top of the mounting cover 141 and extend out of the open top of the mounting tube.

8. The leak-detecting shut-off device as claimed in claim 6, wherein
the mounting segment of the holding mount has
a mounting tube being hollow, formed on and protruding from the rear end of the holding mount, and having
an open top;
an open bottom;
an inner wall;
multiple positioning slices radially formed on and protruding inwardly from the inner wall of the mounting tube at intervals at the open bottom of the mounting tube;
multiple supporting ribs axially formed on and protruding from the inner wall of the mounting tube near the open bottom of the mounting tube, and each one of the supporting ribs having a top end; and
a gap formed between the top ends of the supporting ribs and the positioning slices;

the expansion element is mounted in the mounting tube via the open top of the mounting tube, is mounted in the gap between the supporting ribs and the positioning slices, and has a top extending out of the top ends of the supporting ribs;

the bottom of the expansion element extends out of the open bottom of the mounting tube;

the pushing rod is mounted in the mounting tube, is mounted around the top of the expansion element, and abuts the top ends of the supporting ribs;

the mounting cover is round, is mounted around the top of the expansion element, and abuts the top ends of the supporting ribs; and the pushing panels are formed on and protrude from a top of the mounting cover and extend out of the open top of the mounting tube.

9. The leak-detecting shut-off device as claimed in claim 7, wherein the pushing rod has two pushing panels crossly formed on the top of the mounting cover.

10. The leak-detecting shut-off device as claimed in claim 8, wherein the pushing rod has two pushing panels crossly formed on the top of the mounting cover.

11. The leak-detecting shut-off device as claimed in claim 1, wherein
the mounting segment of the holding mount has
a mounting tube being hollow, formed on and protruding from the rear end of the holding mount, and having
an open top;
an open bottom;
an inner wall;
multiple positioning slices radially formed on and protruding inwardly from the inner wall of the mounting tube at intervals at the open bottom of the mounting tube;
multiple supporting ribs axially formed on and protruding from the inner wall of the mounting tube near the open bottom of the mounting tube, and each one of the supporting ribs having a top end; and
a gap formed between the top ends of the supporting ribs and the positioning slices;

the expansion element is mounted in the mounting tube via the open top of the mounting tube, is mounted in the gap between the supporting ribs and the positioning slices, and has a top extending out of the top ends of the supporting ribs;

the bottom of the expansion element extends out of the open bottom of the mounting tube;

the pushing rod is mounted in the mounting tube, is mounted around the top of the expansion element, and abuts the top ends of the supporting ribs;

the mounting cover is round, is mounted around the top of the expansion element, and abuts the top ends of the supporting ribs; and the pushing panels are formed on and protrude from a top of the mounting cover and extend out of the open top of the mounting tube.

12. The leak-detecting shut-off device as claimed in claim 2, wherein
the mounting segment of the holding mount has
a mounting tube being hollow, formed on and protruding from the rear end of the holding mount, and having
an open top;
an open bottom;
an inner wall;
multiple positioning slices radially formed on and protruding inwardly from the inner wall of the mounting tube at intervals at the open bottom of the mounting tube;
multiple supporting ribs axially formed on and protruding from the inner wall of the mounting tube near the open bottom of the mounting tube, and each one of the supporting ribs having a top end; and
a gap formed between the top ends of the supporting ribs and the positioning slices;

the expansion element is mounted in the mounting tube via the open top of the mounting tube, is mounted in the gap between the supporting ribs and the positioning slices, and has a top extending out of the top ends of the supporting ribs;

the bottom of the expansion element extends out of the open bottom of the mounting tube;

the pushing rod is mounted in the mounting tube, is mounted around the top of the expansion element and abuts the top ends of the supporting ribs;

the mounting cover is round, is mounted around the top of the expansion element, and abuts the top ends of the supporting ribs; and the pushing panels are formed on and protrude from a top of the mounting cover and extend out of the open top of the mounting tube.

13. The leak-detecting shut-off device as claimed in claim 11, wherein the pushing rod has two pushing panels crossly formed on the top of the mounting cover.

14. The leak-detecting shut-off device as claimed in claim 12, wherein the pushing rod has two pushing panels crossly formed on the top of the mounting cover.

15. The leak-detecting shut-off device as claimed in claim 1, wherein the pushing rod has two pushing panels crossly formed on a top of the mounting cover.

16. The leak-detecting shut-off device as claimed in claim 2, wherein the pushing rod has two pushing panels crossly formed on a top of the mounting cover.

* * * * *